(12) United States Patent
Weiss et al.

(10) Patent No.: US 11,780,340 B2
(45) Date of Patent: Oct. 10, 2023

(54) METHOD AND APPARATUS FOR CONDUCTIVE CHARGING

(71) Applicant: HIRSCHMANN AUTOMOTIVE GMBH, Brederis (AT)

(72) Inventors: Marco Weiss, Rankweil (AT); Werner Jaeger, Hohenems (AT)

(73) Assignee: HIRSCHMANN AUTOMOTIVE GMBH, Rankweil/Brederis (AT)

( * ) Notice: Subject to any disclaimer, the term of this patent is extended or adjusted under 35 U.S.C. 154(b) by 61 days.

(21) Appl. No.: 17/286,868

(22) PCT Filed: Oct. 31, 2019

(86) PCT No.: PCT/EP2019/079804
§ 371 (c)(1),
(2) Date: Apr. 20, 2021

(87) PCT Pub. No.: WO2020/089381
PCT Pub. Date: May 7, 2020

(65) Prior Publication Data
US 2021/0331596 A1 Oct. 28, 2021

(30) Foreign Application Priority Data

Oct. 31, 2018 (DE) ...................... 10 2018 127 173.5

(51) Int. Cl.
*B60L 53/16* (2019.01)
*B60L 53/35* (2019.01)
(Continued)

(52) U.S. Cl.
CPC ........... *B60L 53/16* (2019.02); *B25J 15/0019* (2013.01); *B25J 19/0033* (2013.01); *B60L 53/35* (2019.02);
(Continued)

(58) Field of Classification Search
CPC .... H01R 13/4538; H01R 24/38; H01R 43/26; H01R 2201/26; H01R 2107/00;
(Continued)

(56) References Cited

U.S. PATENT DOCUMENTS 4,445,739 A * 5/1984 Wooten ............... H01R 13/4538
439/140
5,466,164 A * 11/1995 Miyazaki ........... H01R 13/5213
439/140
(Continued)

FOREIGN PATENT DOCUMENTS

| CN | 201263019 A | 6/2009 |
| EP | 1679474 A | 7/2006 |

(Continued)

*Primary Examiner* — Gary F Paumen
(74) *Attorney, Agent, or Firm* — Andrew Wilford

(57) ABSTRACT

A vehicle-charging apparatus has a vehicle part fixed on a vehicle having a housing holding a respective set of fixed concentric circular contacts, a movable robot part having a housing holding a respective set of recessed concentric circular contacts complementary to the vehicle contacts, and an engagement guard movable relative to the housing and vehicle contacts and between a lower position in which the vehicle contacts are protected or and an upper position in which the contacts of the vehicle part are uncovered. A spring urges the engagement guard into the lowered position and the robot part is raised when aligned underneath the vehicle part for pressing the contacts of the robot part up against the engagement guard to uncover the vehicle contacts and engage the contacts of the robot part upwardly with the contacts of the vehicle part.

5 Claims, 4 Drawing Sheets

Figure 1:
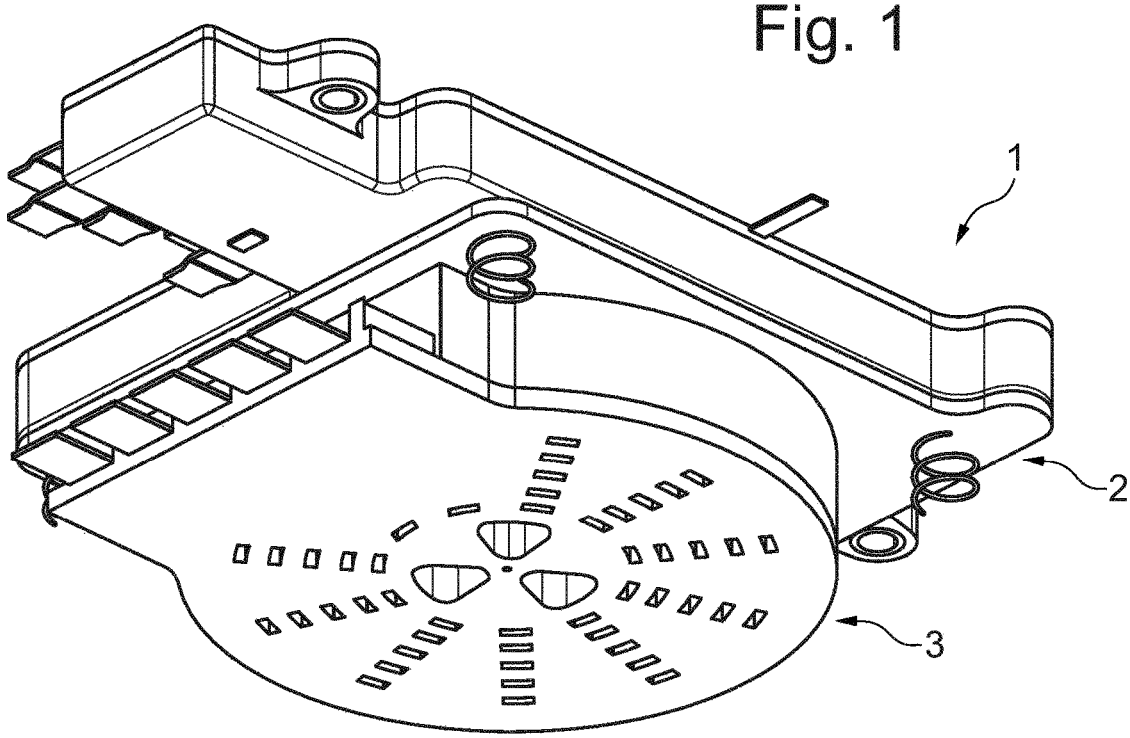

(51) Int. Cl.
  *B25J 19/00*    (2006.01)
  *H01R 24/38*    (2011.01)
  *H01R 13/453*   (2006.01)
  *H01R 43/26*    (2006.01)
  *B25J 15/00*    (2006.01)
  *H02J 7/00*     (2006.01)
  *H01R 107/00*   (2006.01)

(52) U.S. Cl.
  CPC ......... *H01R 13/4538* (2013.01); *H01R 24/38* (2013.01); *H01R 43/26* (2013.01); *H02J 7/0042* (2013.01); *H01R 2107/00* (2013.01); *H01R 2201/26* (2013.01)

(58) Field of Classification Search
  CPC ....... B60L 53/16; B60L 53/35; B25J 19/0033; B25J 15/0019; H02J 7/0042
  USPC .................................................. 439/140, 141
  See application file for complete search history.

(56) References Cited

U.S. PATENT DOCUMENTS

| | | | |
|---|---|---|---|
| 5,490,790 A * | 2/1996 | Okada | H01R 13/4538 439/314 |
| 7,896,666 B2 | 3/2011 | Tung | |
| 10,008,815 B2 | 6/2018 | Flechl | |
| 10,017,062 B2 | 7/2018 | Kufner | |
| 2003/0176087 A1* | 9/2003 | Erez | H01R 13/6485 439/108 |
| 2007/0032112 A1* | 2/2007 | Renautt | H01R 13/4538 439/246 |
| 2015/0280343 A1* | 10/2015 | Hsu | H01R 13/2421 29/884 |
| 2016/0172776 A1* | 6/2016 | Kato | H01R 13/4538 439/700 |
| 2017/0324259 A1* | 11/2017 | Jung | H02J 7/0045 |
| 2019/0020144 A1* | 1/2019 | Tang | H01R 13/4538 |
| 2021/0323423 A1* | 10/2021 | Weiss | B60L 53/16 |

FOREIGN PATENT DOCUMENTS

| | | |
|---|---|---|
| EP | 2595252 A | 5/2013 |
| WO | 2016119000 A | 8/2016 |

* cited by examiner

Disengaged Position

Actuation of Engagement Guard

Charging

METHOD AND APPARATUS FOR CONDUCTIVE CHARGING

CROSS REFERENCE TO RELATED APPLICATIONS

This application is the US-national stage of PCT application PCT/EP2019/079804 filed 31 Oct. 2019 and claiming the priority of German patent application 102018127193.5 itself filed 31 Oct. 2018.

The invention relates to a method and apparatus for conductive charging, in particular of electric vehicles at a base station, according to the features of the preambles of the independent claims.

For conductive charging, a plug connection for connecting electric lines, in particular, is already known from WO 2016/119001 A1 and comprises at least one female connecting element and a male connecting element, wherein the female connecting element receives the male connecting element complementarily and wherein the two connecting elements, upon form-fitting contact, can be releasably connected in a force-fitting manner and wherein a connection-forming region of the male connecting element is designed to taper coaxially and comprises at least one displaceable contact body, which is arranged within the male connecting element in a first position and such that it projects from the male connecting element in a second position. This apparatus, described in this international patent application, enables conductive charging, in particular of electric vehicles at a base station. One connecting element is arranged on the autonomously driving vehicle, whereas the other connecting element is arranged fixed in place but such that it is movable there within certain limits. If the vehicle moves with its connecting element in the direction of the stationary connecting element, these two connecting elements are operatively connected with one another in that the respective contact bodies of the two connecting elements are connected with one another for electrical contacting so that the charging current can then flow.

In this prior art, however, the contact elements (contact bodies) of the male connecting element are movably arranged in this male connecting element. In a first position, they are arranged completely within the male connecting element so that touch and contamination protection of these contact bodies is provided. Only when the two connecting elements have been brought together does the contact body which was hitherto located within the connecting element move out of the male connecting element so that these contact bodies can be contacted by the respective contact bodies of the female connecting element.

The invention provides an improved apparatus and a correspondingly improved method for conductive charging. Conductive charging is understood to mean that the electrical contacts of a base station at which charging energy is provided are operatively connected with electrical contacts of an autonomously driving vehicle so that they touch one another for charging purposes. Compared to the likewise known inductive charging, which takes place in a touchless manner, this conductive charging has the advantage of a considerably greater energy transfer so that autonomously driving vehicles are charged and operative again in a significantly quicker time.

According to the invention, for the apparatus as a whole for conductive charging, a vehicle part is provided which is arranged on the vehicle, in particular the electric vehicle. A robot part is provided independently and at any other desired point, which robot part can be controlled by the vehicle for the purpose of the charging procedure. The robot is therefore fixed in place, but movable within certain limits at the point at which charging is intended to take place. The purpose of this is that the vehicle does not have to carry out the control with its vehicle part overlapping the robot part 100 percent, but rather the robot part locates the vehicle part when the vehicle has been parked for charging purposes.

The contact elements of the robot part are arranged recessed in a housing, and thus protected from external touch or contamination, but are accessible for the contact elements of the vehicle part. The contact elements of the vehicle part likewise have to be protected from touch or contamination. For this purpose, according to the invention, the contact elements of the vehicle part are covered by an engagement guard so that the contact elements of the vehicle part are not accessible while charging is not taking place and while the vehicle part is not operatively connected with the robot part. Only when the robot part is moved in the direction of the vehicle part is this engagement guard moved relatively in relation to the housing of the vehicle part by the robot part so that the contact elements of the vehicle part, which are arranged in a stationary manner in the housing of the vehicle part, are uncovered and can engage in corresponding clearances in the robot part in order to touch the contact elements of the robot part which are located therein and thus contact the said contact elements. For this purpose, the engagement guard is supported on the housing of the vehicle part via springs. This configuration has the significant advantage that the engagement guard is moved in relation to the housing of the vehicle part as a mechanical component, whereas the contact elements of the vehicle part are arranged in a stationary manner therein since, in practice, a movable mechanical component (without an electrical function) can be realized significantly better than an electrically conductive component which, in the case of the prior art, not only serves for electrical contacting but must also be moved at the same time. The invention thus realizes a substantially simpler and safer design of the apparatus for conductive charging. The contacts in the housing of the robot part are likewise arranged in a stationary manner. For example, the contacts in the robot part and the vehicle part are overmolded with a plastic material in certain regions for the purpose of fixing them in the respective housing, wherein a sub-region of the contacts remains exposed after the injection molding process for contacting purposes or for connecting supply lines.

An embodiment of the inventive apparatus and a method for operating this apparatus is described below and explained with reference to FIGS. 1 to 7.

FIG. 1 shows the basic design of an inventive apparatus 1 for conductive charging. A vehicle part 2 is illustrated, which has a housing in which contact elements (not illustrated here) and possibly further functional components are arranged. This vehicle part 2 is arranged at a suitable point, in particular on an underbody, of an electric vehicle which preferably moves autonomously. A so-called robot part 3 is furthermore present, which likewise has a housing in which has contact elements (likewise not illustrated here) and also possibly further functional components. These two parts 2, 3 are operatively connected in an approximately overlapping manner when the vehicle has arrived at a charging station at which the robot part 3 is present.

It is shown in FIG. 1 that the robot part 3 is already in engagement with the vehicle part 2. Further means which are required for movement and position detection for the robot part 3 and the vehicle part 2 are present but not shown.

Figure 2:
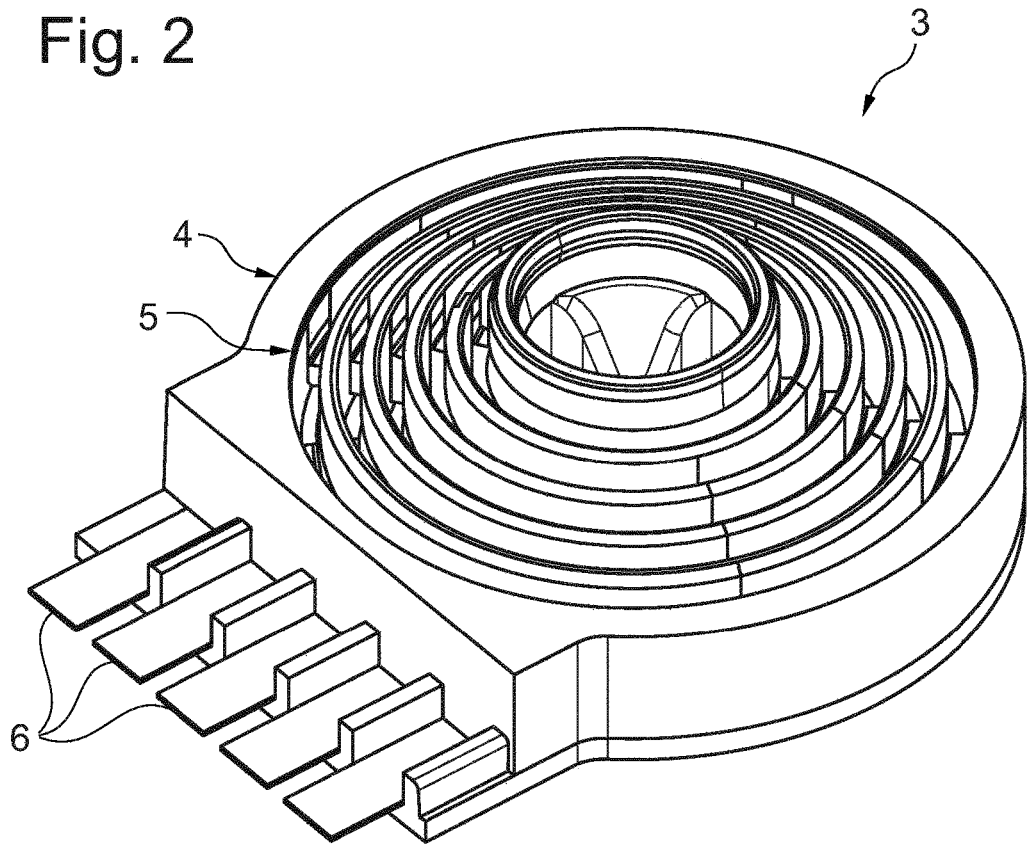

FIG. 2 shows the side of the robot part 3 which faces in the direction of the vehicle part 2. It can be seen that the robot part 3 has a housing 4, preferably made of plastic. A conductor ring 5 (a plurality of conductor rings 5 are illustrated) is present in this plastic housing 4, which conductor rings are connected to an energy source (not illustrated) for charging the vehicle. Each conductor ring 5 ends with a contact tab 6, which is present, for example, for the purpose of establishing contact with a plug connector (not illustrated).

Figure 3:
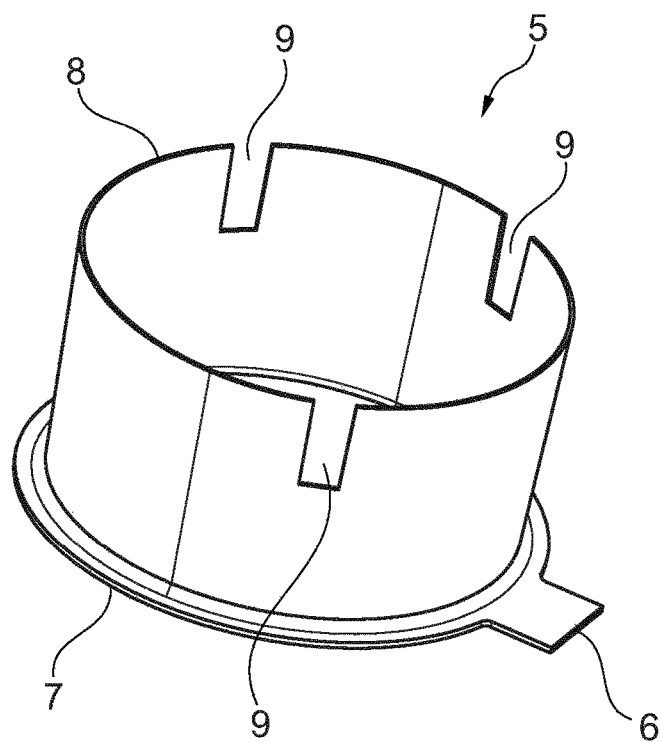

A conductor ring 5 is illustrated in FIG. 3, for example. Such a conductor ring 5 is preferably realized as a deep drawn sheet, which transmits the current to the vehicle and which is arranged, suitably positioned and suitably sized, in the housing 4 of the robot part 3. In this configuration, a plurality of conductor rings 5 are arranged concentrically inside one another. Each conductor ring 5 has a base, which is arranged at the circumferential end of a cylinder portion 8 and protrudes from this. The conductor ring 5 can thus be very easily arranged, in particular fixed, in the housing 4. This is the case in particular when a sub-region of the cylinder portion 8, together with the base 7, is surrounded by a plastic material which forms the housing 4. At least one cutout 9 is present over the circumference of the cylinder portion 8. Precisely three cutouts 9 are present in this embodiment.

Figure 4:
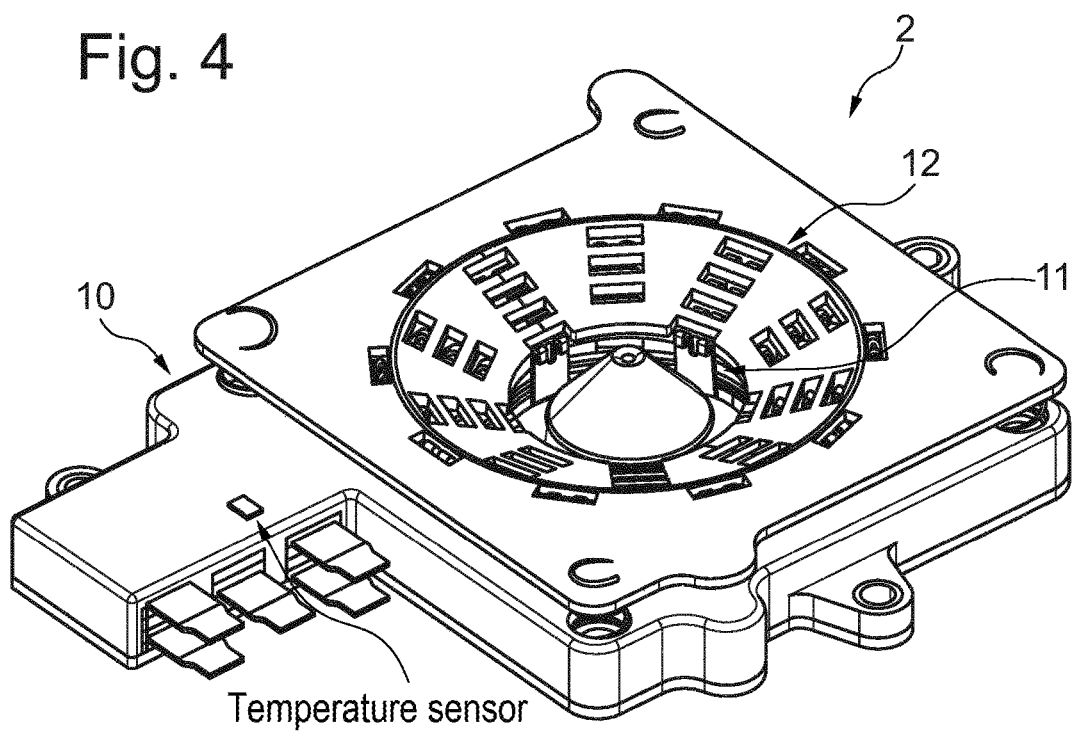

FIG. 4 shows the vehicle part 2, which is arranged with its underside (as viewed in FIG. 4) preferably on an underside of the vehicle (not illustrated). The vehicle part 2 also has a housing 10, preferably made of plastic. Facing the upper side (as viewed in FIG. 4) of the vehicle part 2 is a preferably plate-shaped engagement guard 12, which is movably arranged approximately plane-parallel to the upper side of the housing 10 of the vehicle part 2. The contacts 11 in the vehicle part 2, which are present but not completely visible here, are arranged in a stationary manner in the housing 10 of the vehicle part 2. For the corresponding contacts 11 in the vehicle part 2, openings are present in the engagement guard 12 so that, when the engagement guard 12 is compressed in the direction of the upper side of the vehicle part 2 by the robot part 3, the contacts 11 can penetrate through these openings and are thus uncovered so that they can be applied to the contacts 5 in the robot part 3.

Figure 5:
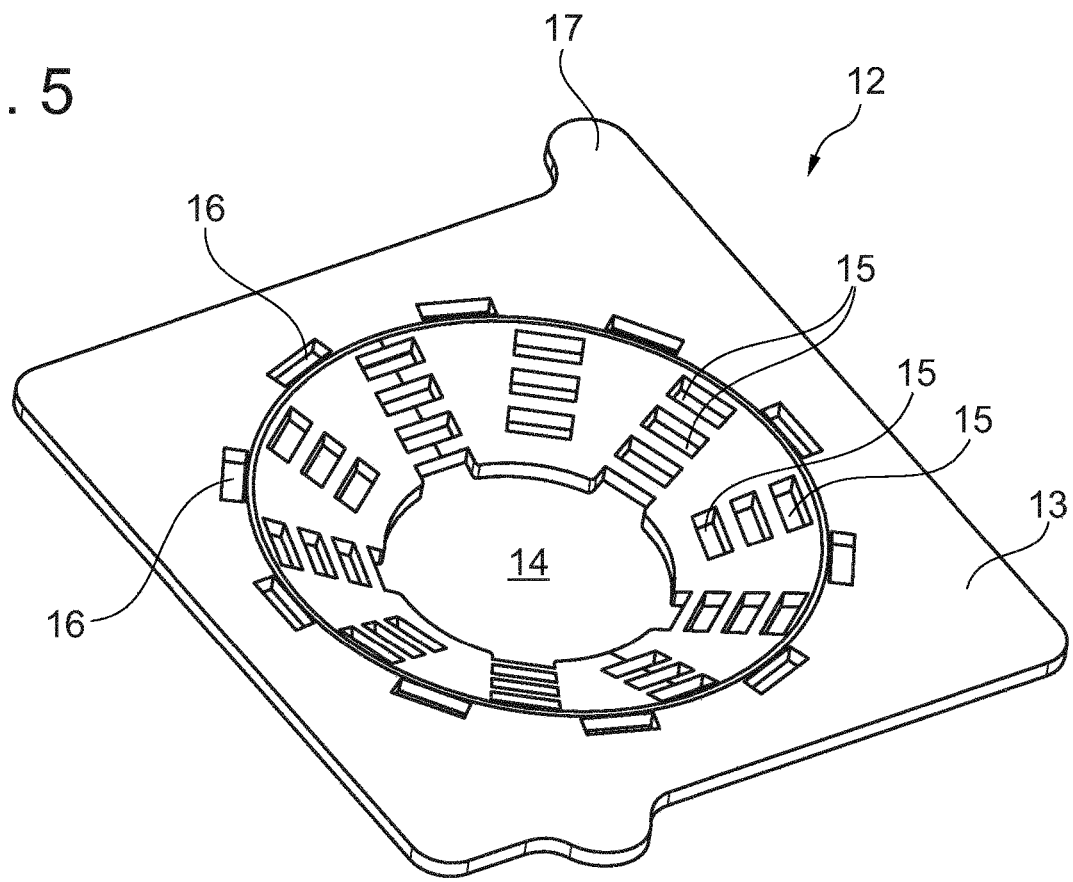

An exemplary configuration of the engagement guard 12 designed in a planar manner and with the corresponding openings for the contacts 11 (spring contacts) is illustrated in FIG. 5. Like the housing 4, 10 of the two parts 2, 3, such an engagement guard 12 can be manufactured in a plastic injection molding process, for example. An essential factor is that the engagement guard 12 is movable relative to the vehicle part 2 in order to either protect or uncover the contacts 11 in the housing 10 of the vehicle part 2, wherein the contacts 11 in the housing 10 of the vehicle part 2 are arranged in a stationary manner.

It is furthermore recognizable and shown that the engagement guard 12 has a base 13 with a central opening 14. Provided around the central opening 14 is a region which extends at a slant to the base 13 and which a plurality of cutouts 15 are arranged circumferentially and also in a slanting manner. The corresponding conductor springs 11 of the vehicle part 2 are guided through these cutouts 15 and uncovered when charging is intended to take place, or arranged beneath these cutouts 15 when charging is not intended to take place, so that, on the whole, the engagement guard 12 results in the conductor springs 11 being covered in the latter case. Moreover, the engagement guard 12 also has a plurality of circumferential cutouts 16 through which further elements can be guided in order to realize a positionally correct coming together of the vehicle part 2 and the robot part 3. To enable the engagement guard 12 to be assembled in the correct position, a coding lug 17 (or possibly further elements or more than one coding lug) can furthermore be present.

Figure 6:
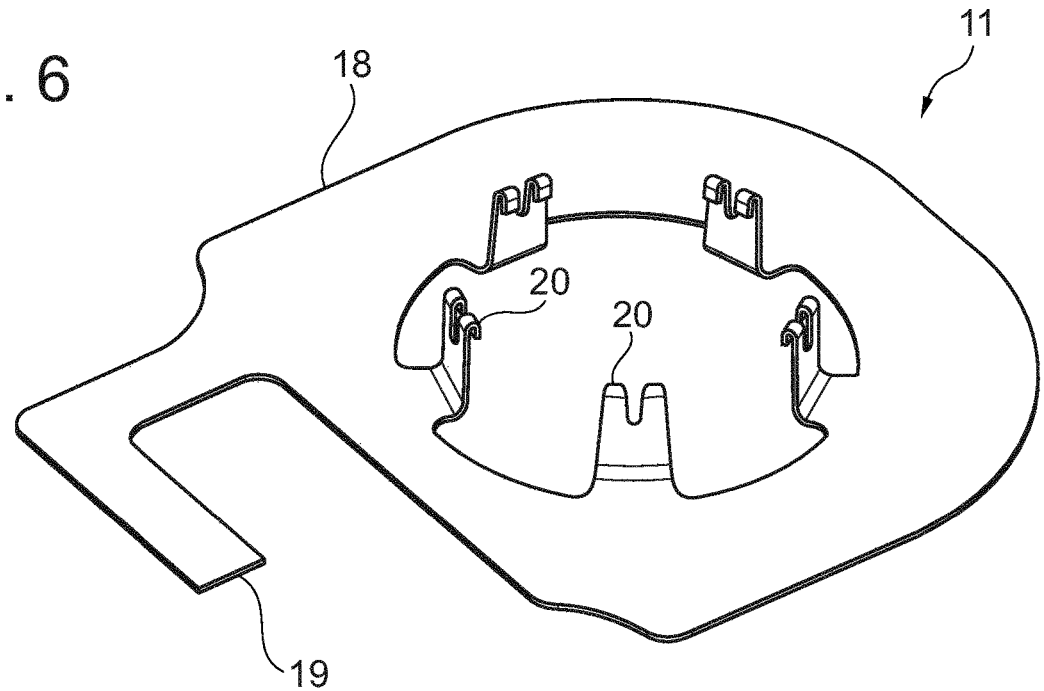

An exemplary configuration of a contact element 11 (conductor spring) of the vehicle part 2 is illustrated in FIG. 6. This contact 11, which is illustrated by way of example, is again a deep drawn sheet, which likewise transmits the current to the vehicle. An external ring is recognizable as the base 18 from which a contact tab (again for the connection of a plug connector (not illustrated)) extends outwards and inwardly angled contacts 20 extend upwards, wherein these contacts 20 are either uncovered or covered by the engagement guard 12 for the purpose of touch and contamination protection. If a plurality of such conductor springs 11 are arranged concentrically in the robot part or, here, the vehicle part 2, they vary in terms of their diameter.

Figure 7A:
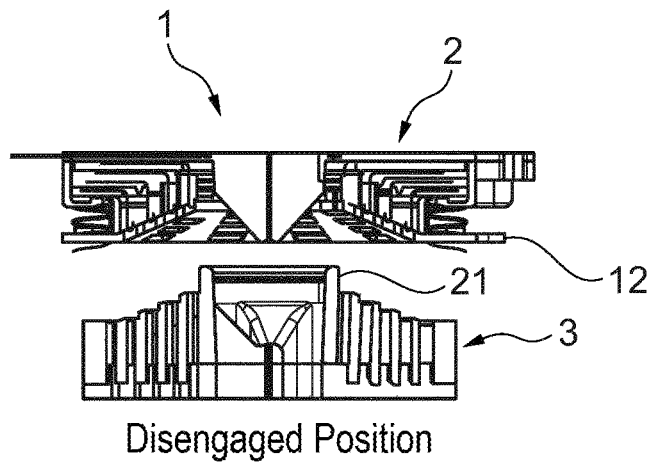
Figure 7B:
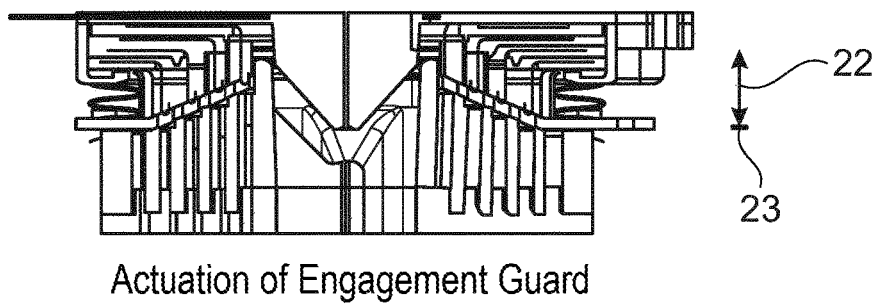
Figure 7C:
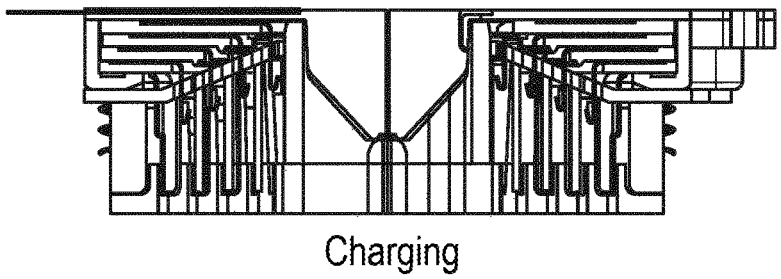

Finally, FIGS. 7[A B and C] shows the method for operating the two parts 2, 3 as described above and as shown in FIGS. 1 to 6.

In the illustration on the left in FIG. 7[A], it can be seen that, although the vehicle part 2 has already been brought into the region of the robot part 3, contacting has not yet taken place. This means that the robot part 3 still has to find and establish its precise position in relation to the vehicle part 2, for which corresponding sensors and means for the movement of the robot part 3 are present, but not illustrated.

The illustration in the center in FIG. 7[B] illustrates the necessary overlap between the robot part 3 and the vehicle part 2 after it has been achieved. It can be seen here that the contact elements 11 in the vehicle part are still arranged within the housing 10 of the vehicle part 2 and are covered by the engagement guard 12. The engagement guard 12 is pressed in the direction of the housing 10 by the robot part 3, in opposition to the spring force, so that the contacts 11 in the vehicle part 2 are thereby uncovered by the engagement guard 12 so that they can come into contact with the contacts 5 of the robot part 3. This operative connection and therefore the contacting of the contacts 5, 11 of the two parts can be seen in the illustration on the right in FIG. 7, so that the charging procedure can now take place.

So that the vehicle part 2 and the robot part 3 can be brought together in a defined position with respect to one another, the housing 4 of the robot part 3 has a dome 21 which is guided through the central opening 14 of the engagement guard 12. In this case, the dome 21 of the robot part 3 is guided through a corresponding mating element on the part of the vehicle part 2, which is designed and suitable for forming a connection with the dome 21 and thereby guiding the robot part 3 during the movement towards the vehicle part 2.

For clarification, the illustration in the center in FIG. 7[B] illustrates how the engagement guard 12 can be moved in a movement direction 22 from its starting position 23, and contrary to this. The starting position 23 of the engagement guard 12 is a position in which the engagement guard 12 is arranged at a plane-parallel spacing from a defined reference point (or reference surface) of the housing 10 of the vehicle part 2. The spacing between the engagement guard 12 and the housing 10 of the vehicle part 2 is a defined spacing in this starting position and is realized, for example, by a spring, preferably a plurality of springs, arranged between the engagement guard 12 and the housing 10 of the vehicle part, in turn preferably at each corner point of the preferably square-shaped engagement guard 12. This at least one spring is compressed in the movement direction 22 and the engagement guard 12 moves in the direction of the defined point on the housing 10 of the vehicle part 2 when a defined point (or a defined surface) of the housing 4 of the robot part 3 is moved towards the vehicle part 2. With a further movement of the robot part 3 in the movement direction 22 towards the vehicle part 2, the engagement guard 12 is also moved further in the direction of the housing 10 of the vehicle part 2 and the at least one spring is thereby compressed so that the contacts 11 of the vehicle part 2 are uncovered and can be operatively connected with the contacts 5 of the robot part 3. This mutual position of the vehicle part 2 and the robot part 3, as already stated, is shown in the illustration on the bottom right of FIG. 7[C].

It goes without saying that, after the completion of the charging process, the two parts 2, 3 are separated from one another again in the reverse procedure, wherein the stationary contacts 11 in the housing 10 of the vehicle part 2 are again covered by the engagement guard 12 after the robot part 3 has been moved away from the vehicle part 2.

LIST OF REFERENCE SIGNS

1 Apparatus for charging
2 Vehicle part
3 Robot part
4 Housing
5 Conductor ring (=contact or contact element)
6 Contact tab
7 Base
8 Cylinder portion
9 Cutout
10 Housing
11 Conductor springs (=contact or contact element)
12 Engagement guard
13 Base
14 Central opening
15 Cutout
16 Opening
17 Coding lug
18 Base
10 Contact tab
20 Contact springs
21 Dome
22 Movement direction
23 Starting position

The invention claimed is:

1. An apparatus for conductive charging, the apparatus comprising:

a vehicle part fixed on a vehicle having a housing holding a respective set of fixed concentric circular contacts, a movable robot part having a housing holding a respective set of recessed concentric circular contacts complementary to the contacts of the vehicle part, the vehicle part being operatively connectable with the robot part for charging purposes, an engagement guard movable relative to the housing and contacts of the vehicle part and between a lower position in which the contacts of the vehicle part are protected or and an upper position in which the contacts of the vehicle part are uncovered, and a spring urging the engagement guard into the lowered position, means for raising the robot part when aligned underneath the vehicle part for pressing the contacts of the robot part up against the engagement guard to uncover the contacts of the vehicle part and engage the contacts of the robot part upwardly with the contacts of the vehicle part.

2. The apparatus for conductive charging as claimed in claim 1, wherein the contacts of the robot part are recessed in the respective housing, protected from external touch or contamination, but are accessible for the contacts of the vehicle part.

3. The apparatus for conductive charging as claimed in claim 1, wherein the contacts of the vehicle part are covered in the lower position of the engagement guard so that the contacts of the vehicle part are not accessible while charging is not taking place and while the vehicle part is not operatively connected with the robot part, and only when the robot part is moved in the direction of the vehicle part is this engagement guard moved relative to the housing of the vehicle part by the robot part so that the contacts of the vehicle part are stationary in the housing of the vehicle part and are uncovered and can engage in corresponding clearances in the robot part in order to touch the contacts of the robot part located therein and thus contact the contacts of the robot part.

4. The apparatus for conductive charging as claimed in claim 1, wherein the contacts in the robot part and/or the contacts of the vehicle part are overmolded with a plastic material in certain regions for the purpose of fixing them in the respective housing of the robot part and/or the vehicle part.

5. The apparatus for conductive charging as claimed in claim 1, wherein the guard is made of nonconductive plastic.

* * * * *